United States Patent
Lee et al.

(10) Patent No.: US 9,076,254 B2
(45) Date of Patent: *Jul. 7, 2015

(54) TEXTURE UNIT FOR GENERAL PURPOSE COMPUTING

(71) Applicant: Intel Corporation, Santa Clara, CA (US)

(72) Inventors: Victor W. Lee, Santa Clara, CA (US); Mikhail Smelyanskiy, San Francisco, CA (US); Ganesh S. Dasika, Ann Arbor, MI (US); Jose Gonzalez, Barcelona (ES); Jatin Chhugani, Santa Clara, CA (US); Yen-Kuang Chen, Cupertino, CA (US); Changkyu Kim, San Jose, CA (US); Julio Gago, Barcelona (ES); Santiago Galan, Molins de Rei (ES); Victor Moya Del Barrio, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,933

(22) Filed: Oct. 16, 2013

(65) Prior Publication Data

US 2014/0176590 A1    Jun. 26, 2014

Related U.S. Application Data

(63) Continuation of application No. 12/633,062, filed on Dec. 8, 2009, now Pat. No. 8,570,336.

(51) Int. Cl.
*G09G 5/00*     (2006.01)
*G06T 11/00*    (2006.01)
*G06F 17/16*    (2006.01)
*G06T 1/00*     (2006.01)

(52) U.S. Cl.
CPC .............. *G06T 11/001* (2013.01); *G06F 17/16* (2013.01); *G06T 1/00* (2013.01)

(58) Field of Classification Search
CPC ......... G06T 1/20; G06T 15/005; G06T 15/04; G06T 1/00; G06T 2200/28; G06F 17/153; G06F 17/16
USPC .......................................... 345/582, 561–563
See application file for complete search history.

(56) References Cited

U.S. PATENT DOCUMENTS 5,345,408 A * 9/1994 Hoogenboom ............... 708/402
5,541,864 A * 7/1996 Van Bavel et al. ............ 708/313

(Continued)

FOREIGN PATENT DOCUMENTS

JP    2003-30683    1/2003

OTHER PUBLICATIONS

British Patent Office issued in corresponding British Application No. GB1017641.0 dated Feb. 21, 2011, (7 pages).

*Primary Examiner* — Ke Xiao
*Assistant Examiner* — Kim-Thanh T Tran
(74) *Attorney, Agent, or Firm* — Trop, Pruner & Hu, P.C.

(57) ABSTRACT

A texture unit may be used to perform general purpose mathematical computations such as dot products. This enables some general purpose computations and operations to be offloaded from a central processing unit to the texture unit. The texture unit may use linear interpolators in order to perform the dot product calculations.

23 Claims, 5 Drawing Sheets

(56) References Cited

U.S. PATENT DOCUMENTS

| | | |
|---|---|---|
| 6,300,935 B1 | 10/2001 | Sobel |
| 6,778,181 B1 * | 8/2004 | Kilgariff et al. .............. 345/582 |
| 6,952,211 B1 | 10/2005 | Cote |
| 7,158,141 B2 | 1/2007 | Chung |
| 7,424,505 B2 | 9/2008 | Peleg |
| 7,528,842 B2 * | 5/2009 | Koguchi et al. ............... 345/582 |
| 7,777,749 B2 | 8/2010 | Chung |
| 2005/0265582 A1 | 12/2005 | Buehler |
| 2007/0070079 A1 * | 3/2007 | Chung et al. .................. 345/582 |
| 2011/0025700 A1 | 2/2011 | Lee |

\* cited by examiner

Example: General 4x4 Convolution

- Can be expressed ad 5 2x2's
    - s1*BF1+d1*P11 +s2*BF2+d2*P12+ s3*BF3+d3*P21+s4*BF3+d4*P22, or
    - s1*BF1+s2*BF2+s3*BF3+s4*BF3+ d1*P11 +d2*P12+ d3*P21+d4*P22, or
    - s1*BF1+s2*BF2+s3*BF3+s4*BF3+s5*BF5+d5* P11

FIG. 5

| Time | Trilinear Filter Unit (TFU) | | | Scaling Unit | 2-entry Buffer | |
|---|---|---|---|---|---|---|
| | Stage 1 | Stage 2 | Stage 3 | | Entry 1 | Entry 2 |
| 0 | A0.B0 | | | | - | - |
| 1 | A1.B1 | A0.B0 | | | - | - |
| 2 | | A1.B1 | A0.B0 | | A0.B0 | - |
| 3 | | | A1.B1 | | A0.B0 | A1.B1 |
| 4 | A0.B0 + A1.B1 | | | | | |
| 5 | | | | A0.B0 + A1.B1 | | |
| 6 | | | | | | |

TEXTURE UNIT FOR GENERAL PURPOSE COMPUTING

CROSS-REFERENCE TO RELATED APPLICATIONS

This application is a continuation of U.S. patent application Ser. No. 12/633,062, filed on Dec. 8, 2009.

BACKGROUND

This relates generally to graphics processing and, particularly, to the texture unit of a graphics processor.

A graphics processor is a dedicated processor that generally handles processing tasks associated with the display of images. A graphics processor may include a number of specialized function units, including a texture unit. A texture unit performs texture operations including texture decompression and anisotropic filtering.

A texture sampler is a special type of texture unit that optimizes texture filtering and performs texture filtering faster than a general purpose processor.

The texture unit may do filtering using linear interpolation units. In addition, other interpolation units, including bi-linear and tri-linear interpolation units, may be available.

DETAILED DESCRIPTION

In accordance with some embodiments, a texture unit, such as a texture sampler, may be utilized to perform mathematical calculations and, particularly, in some embodiments, the calculation of dot products. These tasks may be offloaded from a central processing unit when the graphics processing unit's texture unit (a texture sampler) is not otherwise engaged. Thus, processing efficiency may be improved in some embodiments. In addition, in some cases, the calculation of dot products and convolutions can be done using available capabilities of existing texture units in the form of linear interpolation, bi-linear interpolation, and tri-linear interpolation filtering units.

Texture mapping is a computationally intense task performed by dedicated hardware in a graphics processor. A number of general purpose computing tasks, such as the determination of a two-dimensional convolution for image processing, matrix-matrix multiplication, and two-dimensional lattice computation for finance applications must normally be completed using the general purpose processing unit, even if the texture unit remains idle. However, a texture unit may be adapted to perform dot product calculations, offloaded from the central processing unit when the texture unit is otherwise idle.

Figure 1:
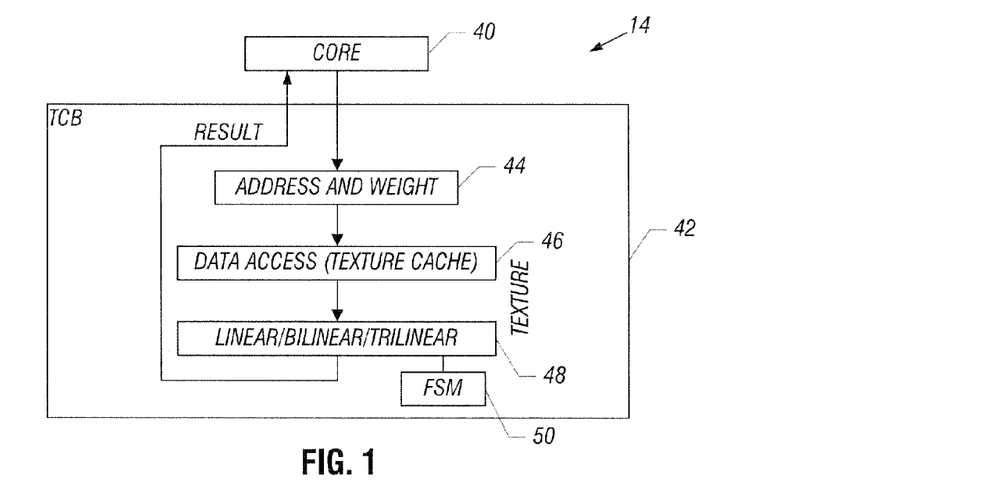
FIG. 1 is a schematic depiction of a texture unit according to one embodiment.

Referring to FIG. 1, a texture unit core 40 of an interpolation unit 14 receives a texture request via a texture control block 42. The texture control block 42 may include a pointer to texture surfaces, the width and height of the texture surfaces, the texture coordinates (u, v) for n pixels to be textured, the type of filtering operation to be performed, such as linear, bi-linear, or tri-linear, and the texture filter results.

An address generation stage 44 computes addresses of all the texels used by a given filtering operation. The coordinates u and v of the pertinent pixel are passed in normalized form between 0.0 and 1.0. They are unnormalized by multiplying them by a surface dimension. For example, u becomes i.bu, where i is an integer and bu is a fraction. The integer portion is used to produce nearest neighbors. In the case of bi-linear interpolation, there are four neighbors: (i,j) (i+1,j) (i,j+1), (i+1,j+1). In tri-linear filtering operations there are eight neighbors. The fractional part may be used to calculate the weights which may be used when blending the neighboring pixels.

A data access stage 46 accesses all of the necessary neighboring pixels. This stage may have a relatively long latency, first in, first out buffer, to tolerate long latencies.

The filtering stage 48 performs linear, bi-linear, or tri-linear interpolation of the neighbor pixels using a finite state machine (FSM) sequencer. The filtering stage is implemented in a tree of linear interpolation filters with three possible coefficient inputs. The filtering unit may contain a number of linear interpolators that are connected in a tree fashion to perform bi-linear and tri-linear filtering.

Bi-linear filtering involves three linear interpolations on two levels. Tri-linear filtering involves seven linear interpolations on three levels. For bi-linear filtering, only one coefficient (bu) is allowed for the first level and a second coefficient (bd) is used for a second level. With tri-linear filtering, coefficients used for the first two levels as on the bi-linear operations and the third coefficient (bw) is used for the third level.

Figure 2:
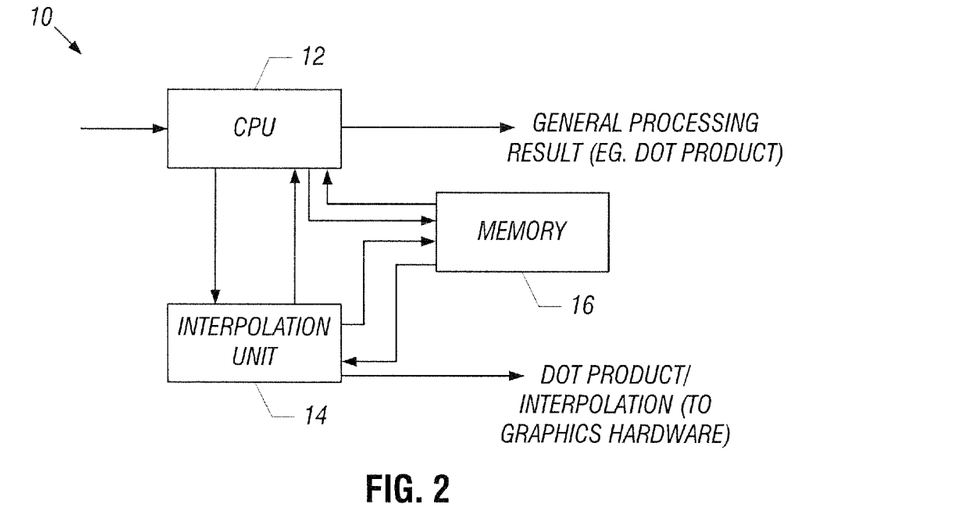
FIG. 2 is a schematic depiction of one embodiment of the present invention.

The general purpose or central processing unit may be coupled to either a texture sampler or directly to an interpolation unit. One system 10, referring to FIG. 2, shows a general purpose or central processing unit 12 coupled to a dedicated interpolation unit 14.

The general purpose processing unit may be a central processing unit having one or more cores, a controller, or a digital signal processor, to mention a few examples. In one embodiment, the interpolation unit may be a texture unit, such as a texture sampler, of a graphics processing unit. A dedicated interpolation unit is hardware or software designed for interpolation using linear interpolation. Both the central processing unit 12 and the interpolation unit 14 may be coupled to a memory 16. The output of the central processing unit may include general processing results, such as dot products.

When the central processing unit 12 is otherwise occupied and the interpolation unit 14 is available, the interpolation unit 14 may use its linear interpolation capabilities to perform dot products operations offloaded from the central processing unit 12 to the interpolation unit 14. Thus, the interpolation unit 14, generally dedicated to graphics functions, such as filtering and interpolation, may use its available linear interpolation capability to perform dot product calculations for the central processing unit.

Figure 4:
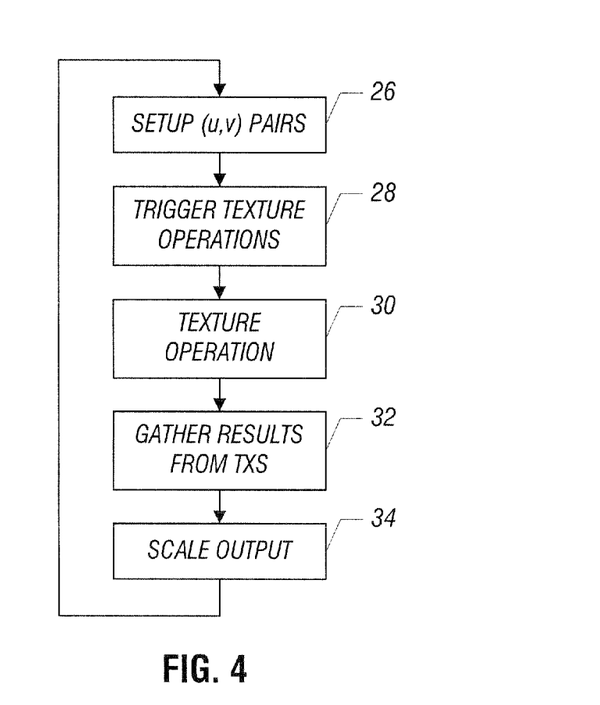
FIG. 4 is a flow chart for one embodiment of the present invention.

Referring to FIG. 4, originally, the central processing unit 12 sets up the (u, v) pairs for each pixel, as indicated in block 26. Then the central processing unit triggers the texture operations, as indicated in block 28. A texture operation 30 is performed in the interpolation unit 14. Then the central processing unit gathers the results from the interpolation unit, as indicated in block 32, and scales the output, as indicated in block 34.

For ease in programming, a library function or application program interface (API) may be used to simplify the programming of the texture unit (TXS) to perform general purpose processing. Two functions related to the general dot product computation of a two input vector A and B (i.e., A dot B=A0*B0+A1*B1+ . . . +An*Bn) is:

TXS-DP(int $m$,int $n$,Datatype_$t$_$t$*$A$,Type*$W$,Mask_$t$_$t$*Mask,Type*result):

where m and n are the dimension of the dot product (DP), A is one of the vectors to be multiplied, W points to the vector of the coefficient normalized from the input vector B. A mask is an array of bits, of type Mask_t which is used to handle negative or degenerated coefficients, as explained herein. The result of the dot product operation is returned in the result. The vector A, the vector B and the result can be different types of vectors, signified by Datatype_t data type, including char, int, or float. While some of the dot product operation may be performed in the texture unit, some parts may be performed on the central processing unit.

As part of the computation, the vector B may be normalized. A high level function or API may be utilized to facilitate programming:

TXS_LerpCoefTransform(int $m$,int $n$,float*$B$,float*$W$, Mask_$t$_+*mask):

where B is the input vector, W is the normalized vector used in the call to the texture unit. The function may also generate a mask to handle negative or generated coefficients, with the mask being another input to the texture unit call.

An example of the determination of dot products using linear interpolation capabilities is a two-dimensional dot product. However, the present invention is not so limited. The way that a dot product calculation may be performed using linear interpolation capabilities is as follows:

A simple 2-element dot-product has the form:

$$P \cdot w = \sum_{i=0}^{1} P_i \times w_i$$

where P is a channel value and w is a coefficient. If we expand this equation for the dot product (DP), DP=P0*w0+P1*w1= (w0+w1)*lerp(w0/(w0+w1), P0, P1) (Formula 1).

This is readily mappable to the linear filter provided by the texture sampler. The processor core needs to provide the (u,v) coordinates to generate the w0/(w0+w1) coefficient correctly. Scaling by the (w0+w1) factor can happen either on the processor core, or on the interpolation unit or texture sampler if they have support for such scaling operation.

Similarly, we can map 4- and 8-element dot-products to the bilinear and trilinear filter operation. While there are many ways to do this mapping, two embodiments of such mapping are as follows. In the first embodiment, 4-element dot product can be expressed using bilinear filtering as follows:

$DP0_{00-11}=w00*P00+w01*P01+w10*P10+$
$w11*P11=s*BF(u,v,P00,P01,P10,P11)+d*P10$,
where $u=w01/(w01+w00),v=w10/(w00+w10),s=$
$((w00+w01)*(w00+w10))/(w00)$ and
$d=(w00*w11-w01*w10)/((w00+w01)*(w00+w10))$.

In the second embodiment, a 4-element dot product is mapped to 2-level tree of linear interpolators (lerps) by recursively applying Formula 1 to each pair of dot products (1-level of lerps) and then to the resulting sum (second level of lerps, in the following way:

$DP0_{00-11}=w00*P00+w01*P01+w10*P10+w11*P11=$
$(w00+w01)*lerp(w00/(w00+w01),P00,P01)+$
$(w10+w11)*lerp(w10/(w10+w11),P10,P11)=$
$(w00+w01+w10+w11)*lerp((w00+w01)/(w00+$
$w01+w10+w11),lerp(w00/(w00+w01),P00,P01),$
$lerp(w10/(w10+w11),P10,P11))$ For larger dot products there are several ways to do the mapping. With higher order interpolation units, such as trilinear, or even quadlinear, both embodiments described above can be re-written more compactly to take advantage of such units, to do 8-element, or even 16-element dot product. For example, 8-element dot product for 2×4 quadrant can be represented as 3-level tree of lerps by recursively applying Formula 1.

In cases where the size of the product that can be performed in hardware is less than size of the required dot product operation, the full dot product may be partitioned into the sum of smaller dot products, such that each such dot product is done on hardware (for example, using one of the two preferred embodiments described above), using central processing unit 12 or a texture sampler to add them all up.

For example, following chart illustrates how to compute a 16-element dot product, when only bilinear unit to do 4-element dot product is available, using the embodiment above to do the 4 element dot product:

| P00 | P01 | P02 | P03 |
| P10 | P11 | P12 | P13 |
| P20 | P21 | P22 | P23 |
| P30 | P31 | P32 | P33 |

Figure 5:
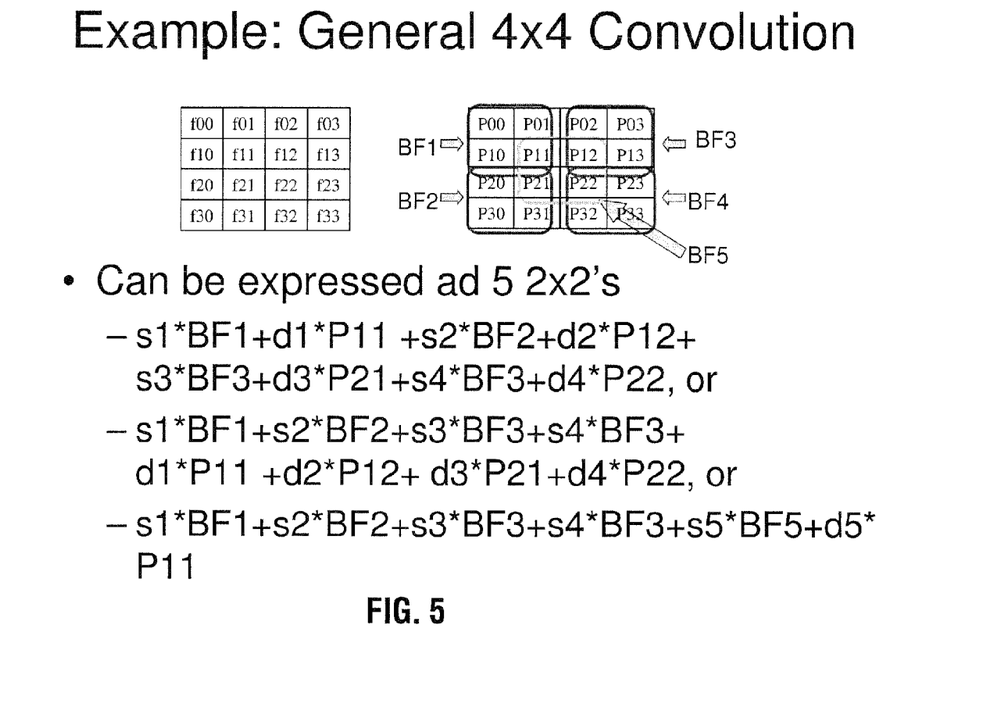
FIG. 5 shows an example of a convolution according to one embodiment.

Mathematically, a 16-element dot product can be expressed as: s1*BF1+s2*BF2+s3*BF3+s4*BF4+s5*BF5+ s6*P11, where, referring to FIG. 5, BF1 is bilinear filtering operation for upper left quadrant (P00, P01, P10, P11), BP2 is the same for lower left quadrant (P20, P21, P30, P31), BF3 is the same for the upper right quadrant (P02, P03, P12, P13), BF4 is the same for lower right quadrant (P22, P23, P32, P33), and BF5 is the center quadrant (P11, P12, P21, P32).

The general procedure of mapping a general N-element dot product to a tree of linear interpolators is set out below. Given the list of N dot product weights (Win), or coefficients, the procedure generates corresponding lerp weights (Wout) at all levels of lerps. It also optionally truncates the bits of output weights, in case the filtering unit has limited precision.

```
void GenWeights(float* Win,float* Wout,int N)

{
    int MaxLevel=ilog2(N);
    for(int level=1; level <= MaxLevel; level++)
        for(int s=0; s < Length; s+=(1<<level))
        {
            int beg=s, end= s+(1<<level)-1;
            int halfway=beg+(end-beg)-1;
            Wout[level, beg,end]=Sum(Win, beg, halfway) /
                                  Sum(Win, beg,end);
            if( limited_precision == true)
                truncatebits(Wout[level, beg,end]);
        }
}
```

It is not desirable to deal with linear interpolation coefficients that are either not defined or negative. For example, suppose that a 1×2 dot product is P0−P1. In this case, the linear interpolation coefficient is not defined due to division by zero. Another example is the dot product P0−2*P1. In this case, the coefficient is negative (1/(−1)). Passing a negative coefficient to the linear interpolation unit may not work due to the fact that the linear interpolation unit only expects positive coefficients.

Figure 8:
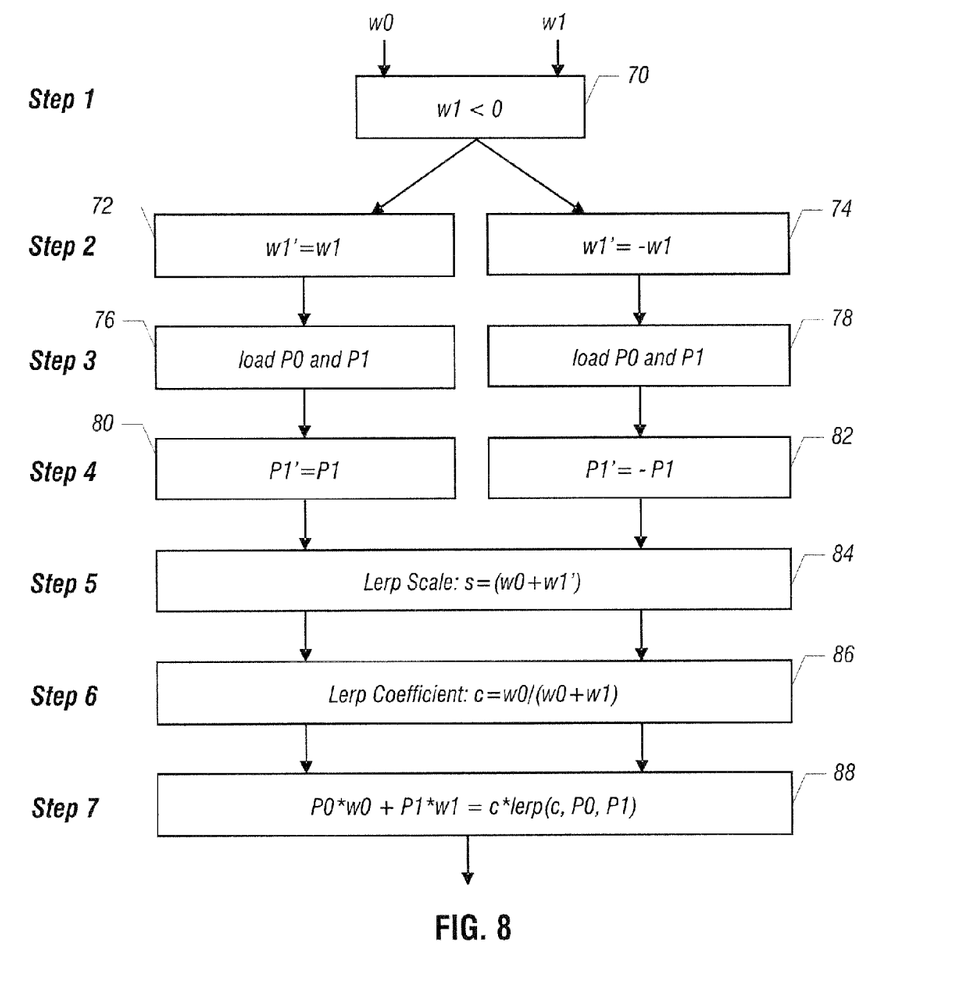
FIG. 8 is a flow chart for generating and handling negative coefficients according to one embodiment.

To avoid both of these constraints, whenever the dot product coefficient is negative, its sign may be changed. To compensate, the sign of the corresponding P or channel value may be reversed during the filtering operation. To compensate for the sign change, a control mask is passed for each of the texels with a negative coefficient to the texture control block. The mask being zero means that the corresponding coefficient is positive in one embodiment. A mask of one means that the corresponding coefficient is negative and signals the apparatus to reverse the sign of the texel data in one embodiment. However, all that matters is that the mask values for positive and negative coefficients be distinguishable. For example, in the case of P0−2*P1, change (−2) to 2 to get P0+2*P1. This results in the linear interpolation computation: 3*lerp(⅓, P0, −P1), where lerp is the linear interpolation.

The sign of P1 is flipped to compensate for the sign change in its coefficient. Referring to FIG. 8, in block 70 and step 1, the coefficients w0 and w1 are received and it is determined that coefficient w1 is less than zero or negative. In step 2, a w1 is set equal to w1', as indicated in blocks 72 and 74 on the left and right sides. In step 3, on the left side, P0 and P1 are loaded in block 76 and the same thing is done at the right side in block 78. Then, in step 4, P1 is set equal to P1' on the left side in block 80 and negative P1 is set equal to P1' on the right side in block 82. Next, in step 5, the lerp scale is defined as s=(w0+w1'), as indicated in block 84. The lerp coefficient is defined as c=w0/(w0+w1), as indicated at block 86. Finally, in step 7, as shown in block 88, P0*w0+P1*w1 is set equal to c*lerp (c, P0, P1), as indicated in block 88.

The sequence described above can be implemented in software or hardware. In a software embodiment, it may be implemented by computer executable instructions stored, for example, in the memory 16 and executed by the central processing unit 12 of FIG. 2. Thus, a computer readable medium may be the memory 16 and the computer may be implemented by the central processing unit 12.

Thus, it is possible to map 2, 4, and 8 element dot products into a maximum of three levels of linear interpolation.

For any application that involves texture unit kernels, such as n-element dot products, one can rewrite it using the available library of linear interpolation calls.

The main code is still executed on the general purpose processor core and the library functions are partially executed on the partially core and partially executed on the texture unit. The part of the library function that executes on the processor core involves (1) setting up and (2) initiating the communication between the core and (3) the texture unit and accumulating immediate results for final output.

These essentially are the three main overheads related to the texture unit scheme. The performance gain from the algorithm may be offset by these offsets. If these three steps are implemented using dedicated hardware of the texture sample, these overheads may be reduced and may achieve higher performance, in some embodiments.

One application of some embodiments is the determination of two-dimensional convolutions. This is a common operation in image processing and many scientific applications. A two-dimensional convolution may be implemented using two texture unit (TXS) functions, including a transform that transforms a convolution filter coefficient into the required normalized filter values and a function that performs the actual convolution. For an input image of size N×N and k×k filter, the two-dimensional kernel is as follows:

```
Input: InputImage[i][j] of size N x N
Filter: Filter[m][n] of size k x k
TXS_LerpCoeffTransform(k, k, &Filter[0][0],
&Filter_Lerp[0][0], &mask[0][0]);
for(i=0; i < N; i++)
    for(j=0; j < N; j++) {
        TXS_DP(k, k, &Filter_Lerp[0][0], &InputImage[i][j],
&mask[0][0], &result);
        OutputImage[i][j] = result;
    }
```

A call to the transform takes original filter coefficients and converts them into linear interpolation coefficient form. For each image pixel, input image [i][j], convolution is performed using the transformed filter_lerp.

As the dot product is offloaded to the texture unit, the processor core is now free to perform other operations.

Note that a call to setup coefficients TXS_LerpCoeffTransform to transform a convolution filter coefficient into the normalized filter values introduces some overhead. However this overhead is amortized over multiple usages of such values, which is certainly the case with dot product. It is also possible that there may be a more general filtering which does not use transformation of such coefficients, in which case there will be no call to TXS_LerpCoeffTransform, and hence no further overhead.

Another example is matrix multiplication. Again, two graphic texture unit functions are used, including the transform function that transfers a row of one matrix into a texture unit required coefficient format and the function that performs the dot product to a column of another matrix. The following code may perform the calculation C=A*B, where matrices A, B, and C are square matrices of dimension N. These matrices may be of any type including char, short, int, or float.

```
for(row=0; row < N; row++) {
    TXS_LerpCoeffTransform(1, N, A[row], RowAlerp, mask);
    for(column=0; column < N; column+=4) {
        TXS_DP(1, N, RowAlerp, &B[0][column], mask,
        &result); for(c=0; c < 4; c++)
            C[row][column+c]=result[c]
    }
}
```

Each row of the matrix A may be transformed into the vector of the linear interpolation coefficients, RowALerp. RowALerp is then used to perform a dot product with every column of the matrix B, B[*][column]. The result of a single call to the dot product function is four elements of C. Each call to the dot product function computes four consecutive elements of C: C[row][column], C[row][column+1], C[row][column+2], C[row][column+3].

Still another example is the determination of the two-dimensional binomial tree lattice. This may be used in computational finance to numerically solve a partial differential equation that describes market dynamics over time. The two-dimensional lattice shows the value of a tradable element whose value is dependent on the price of two random variables, such as a bond in a foreign currency whose value is dependent on the bond value in the foreign exchange rate. At each time step, the two-dimensional lattice may be traversed with a 2×2 window using four neighboring cells to computer the expected price in the next time step:

bCurr[ji][j2]=P1*vPrev[j1+1][j2+1]+P2*vPrev[j1+1][j2]+P3*vPrev[j1][j2+1]+P4*vPrev[j1][j2].

A typical problem starts with 2000×2000 lattice. With such a lattice, there are 1999×1999 2×2 windows. The 1999×1999 set of results forms the lattice of the next iteration. Computation may continue until there is one item left in the lattice.

P1, P2, P3, and P4 are constants throughout the iterations and can be computed in advance. They are positive and non-zero for all practical problem parameters. The basic operation with the 2×2 window reduces to a weighted sum computation with constant coefficients that match well into the linear interpolation computation on the texture sampler.

In some embodiments, the operation that performs the dot product may be implemented in software or firmware. In such cases, a computer may be controlled by computer executable instructions stored on a computer readable medium such as a semiconductory memory. In other embodiments, the operations may be implemented entirely in hardware and, in still other cases, combinations of hardware and software may be utilized.

Figure 3:
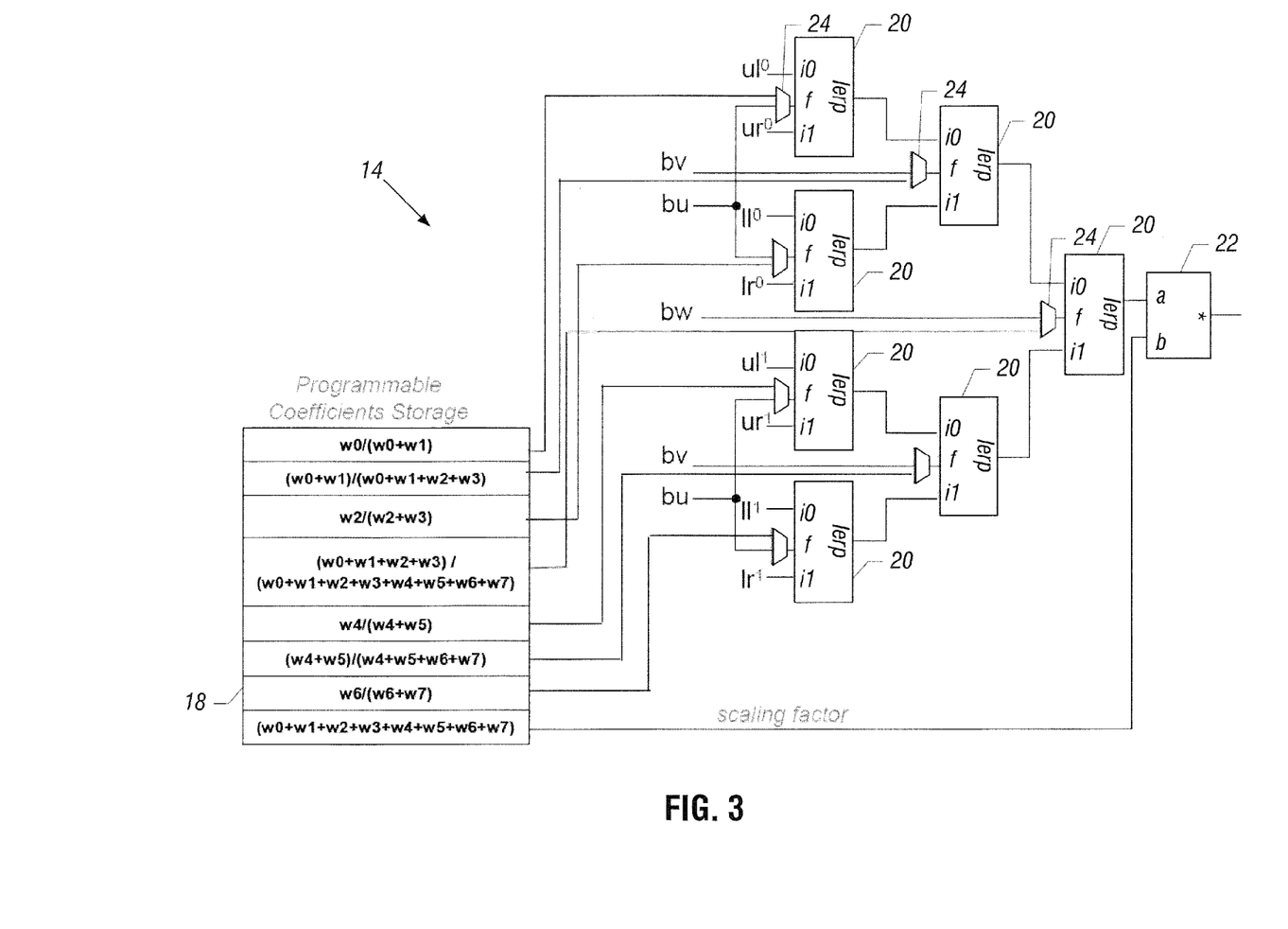
FIG. 3 is a depiction of a texture unit including programmable linear interpolation units for performing dot products in accordance with one embodiment.

Referring to FIG. 3, independent inputs may be provided to each linear interpolator (Lerp) 20 in a linear interpolator tree to effectively compute a 2, 4, or 8 element dot products with the available linear interpolation functions, without any spillover computation in some embodiments. The additional storage needs may be small in some cases, such as eight 32 bit locations for 32 bytes total. Additionally, a 32 bit multiplier 22 may be used. A programmable coefficient storage 18 may store the coefficients that are needed by the linear interpolators and provide them through a multiplexer 24 to each linear interpolator 20. In addition, a scaling factor may be provided to one input of the multiplier 22.

In some embodiments, the linear interpolator coefficients 18 may be programmed directly by a programmer. Coefficients 18 are derived for 8-element dot product using recursive application of formula 1. To save space, only the final result is shown below, wherein coefficients 18 come from coefficients of the lerps below:

w0*P0+w1*P1+w2*P2+w3*P3+w4*P4+w5*P5+w6*P6+w7*P7=(w0+w1+w2+w3+w4+w5+w6+w7)lerp((w0+w1+w2+w3)/(w0+w1+w2+w3+w4+w5+w6+w7)lerp((w0+w1)/(w0+w1+w2+w3),lerp(w0/(w0+w1),P0,P1),lerp(w2/(w2+w3),P2,P3)),lerp((w4+w5)/(w4+w5+w6+w7),lerp(w4/(w4+w5),P4,P5),lerp(w6/(w6+w7),P6,P7)))

A finite state machine sequencer may be added to the texture sampler to enable the texture sampler to handle any m×n-element dot product in the form of:

$$\sum_{i=0}^{m}\sum_{j=0}^{n} w_{i,j} * P_{i,j}$$

The sequencer can be implemented in software, hardware or a combination of both. The sequencer may break up the m×n dot product into a combination of 2-, 4- or 8-element dot product operations. It then cycles through the dot product operations and accumulates for the final output. An oddly sized dot product can be padded to the next even size dot product so that it can be effectively broken up into a 2-, 4- or 8-element dot product.

A software sequencer may use the processor core 40 (FIG. 2) to execute the two main steps of setup and accumulation.

The setup step may involve breaking W={w}i,j into a sequence of basic 1×1, 1×2, 2×2 or 2×4 sub-blocks, and transforming each block into the form of lerp coefficients as shown above. The accumulation step may involve performing a basic convolution using transformed coefficients and some 1×1, 1×2, 2×2 or 2×4 region of the array, P. It may create a corresponding texture control block, launch each sub-block to the texture sampler, and accumulate the returned values into the final result. The following pseudo code illustrates one possible implementation for each of the two main steps:

```
// Setup step
for(i=0; i < m; i+=2)
    for(j=0; j < n; j+=4)
    {
        1.  basicW = min(2, m-i);
        2.  basicH = min(4, n-j);
        3.  get basic subblocks: W[i:i+basicW, j:j+basicH]
        4.  generate lerp coefficients + scaling factor
            and store them to W[i:i+basicW, j:j+basicH]
    }
// Accumulationstep
set result to 0;
for(i=0; i < m; i+=2)
    for(j=0; j < n; j+=4)
    {
        1.  basicW = min(2, m-i);
        2.  basicH = min(4, n-j);
        3.  specify sample point S within P[k:k+basicH, l:l+basicW]
        4.  create texture control block (TCB) based on
            W[i:i+basicW, j:j+basicH]
            and S and launch texture request
        5.  wait for request to return the intermediate
            value
        6.  accumulate intermediate value into result
    }
```

Figure 6:
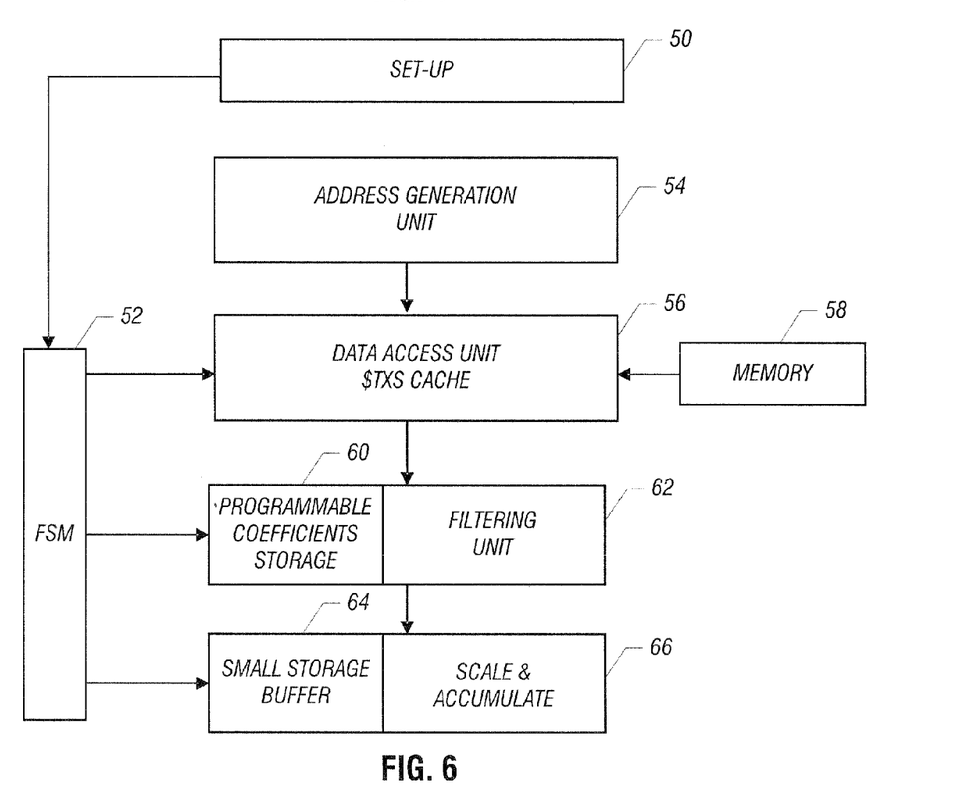
FIG. 6 is a hardware finite state machine according to one embodiment.

A hardware implementation, as shown in FIG. 6, can eliminate the overhead involving the processor core for the accumulation step. The implementation may include a set up unit 50, coupled to a finite state machine 52. An address generation unit 54 provides addresses to a data access unit 56 coupled to a memory 58.

One possible implementation of a hardware sequencer involves three pieces of logic. A small finite state machine 52 next to a filtering unit 62 generates texture requests for each sub-dot product computation and feeds them to the texture pipeline. The filter unit 62 may receive selected programmable coefficients from storage 60. A few small buffers 64 at last stage of filtering unit 62 use as an inputs data for the next level of LERPs. Scaling unit 66 performs multiplication of the final result by the scaling factor (e.g., w0+w1+w2+w3 in case of 4-element dot product). Other hardware as well as hybrid software/hardware implementations may also be used.

To further understand the hardware sequencer operation, consider an example which computes a 4×4 dot-product. Since the largest dot-product the filtering unit can perform, in one embodiment, is an 8-element dot product, the 4×4 dot-product may be broken up into two 8-element dot products.

Two 4×4 matrices A and B may be broken up into two 2×4 sub-matrices A0/A1 and B0/B1. The hardware sequencer first computes the 8-element dot-product of A0 and B0 then accumulates it with the 8-element dot-product of A1 and B1. A timing diagram (FIG. 7) illustrates such an operation at sequences of times 0 through 6, stages 1 through 3, using a two-entry buffer 64 and a scaling unit 66.

Figure 7:
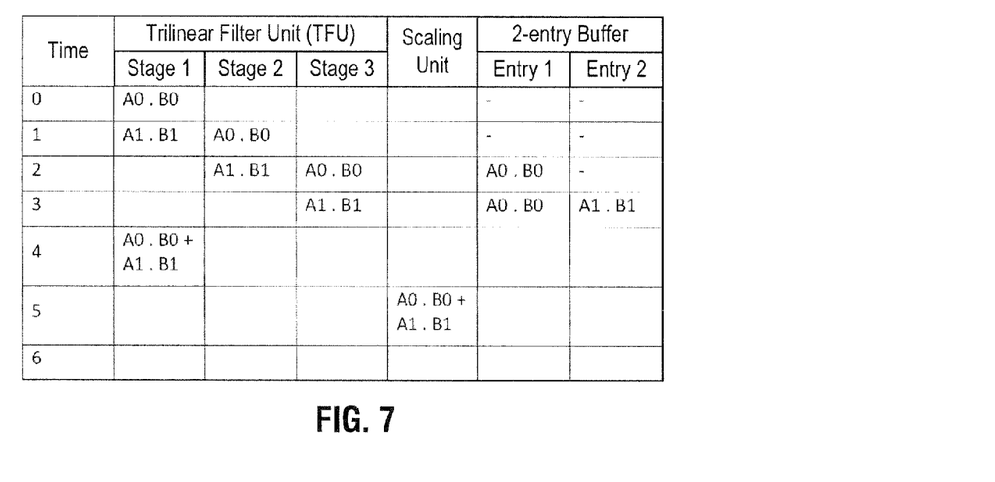
FIG. 7 is a timing diagram for a sequence state machine according to one embodiment.

In this example, the hardware sequencer finite state machine 52 issues the 8-element dot product (A0.B0) and (A1.B1) to trilinear filter unit's 3-stage pipeline. When the output of A0.B0 comes out of the 3-stage pipeline at time 2, it is saved in the first entry of a 2-entry buffer. When the output of (A1.B1) arrives at time 3, it is saved into the second entry of the 2-entry buffer. In time 4, the finite state machine takes the outputs and feeds them back to the filter unit 62 to perform a linear filter (which would only take one cycle). In time 5, the combined output (A0.B0+A1.B1) from the filter unit is then fed into the scaling unit to perform the final scaling. At time 6, the 4×4 dot-product between matrix A and B is completed and returned back to the processor core.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor. While linear interpolation is described herein, other forms of interpolation can also be used.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining that a dot product coefficient is negative and changing the sign of the coefficient to a positive value;
   sending the positive value to a linear interpolator;
   indicating whether the interpolator should revise the sign of the resulting dot product texel data; and
   using the programmable linear interpolator, that does not accept negative coefficients, to calculate the dot product and to convert the sign of texel data in the dot product.

2. The method of claim 1 including using a finite state machine sequencer to handle any sized dot product.

3. The method of claim 2 wherein said state machine breaks up a larger dot product calculation into more than one smaller calculations.

4. The method of claim 3 including breaking a sequence of dot product calculations into sub-blocks and transforming each sub-block into linear interpolation coefficients.

5. The method of claim 2 including using a software sequencer finite state machine.

6. The method of claim 2 including using a hardware sequencer finite state machine.

7. The method of claim 1 including compensating for the sign change of the dot product coefficient by reversing the sign of the corresponding channel value during a filtering operation.

8. The method of claim 1 including compensating for the sign change by passing a control mask for each of the texels with a negative coefficient to a texture control.

9. The method of claim 1 including mapping a general N-element dot product to a tree of linear interpolators.

10. An apparatus comprising:
    a processing entity;
    a memory coupled to said processing entity; and
    a programmable linear interpolator coupled to said processing entity, wherein said programmable linear interpolator does not accept negative coefficients;
    said entity to determine that the dot product coefficient is negative and to change the sign of the coefficient to a positive value, send the positive value to a linear interpolator, and indicate whether the interpolator should revise the sign of the resulting dot product texel data; and
    said interpolator to calculate the dot product and to convert the sign of texel data in the dot product based on an indication from said entity.

11. The apparatus of claim 10 including a finite state machine sequencer to handle any sized dot product.

12. The apparatus of claim 11 wherein said sequencer to break up a dot product into a combination of smaller dot product operations.

13. The apparatus of claim 12 wherein said sequencer to cycle through the dot product operations and accumulate a final result.

14. The apparatus of claim 12 wherein said sequencer to pad an odd sized dot product to the next even sized dot product.

15. The apparatus of claim 14 wherein said processing entity to execute a set up and accumulation operation, said set up operation to break coefficients into sub-blocks.

16. The apparatus of claim 13, said processor to implement an accumulation step by performing a convolution using the transformed coefficients from said set up step.

17. The apparatus of claim 16 wherein said sequencer finite state machine includes a filtering unit, said finite state machine to generate texture requests for each sub-dot product computation and to feed them to a texture pipeline.

18. The apparatus of claim 14 including a scaling unit to perform multiplication of the final result by a scaling factor.

19. The apparatus of claim 12 wherein said finite state machine sequencer to generate interpolator requests for each sub-dot product computation and to feed them to the interpolator.

20. The apparatus of claim 10, including a tree of linear interpolators, a general N-element dot product mapped to said tree of linear interpolators.

21. A non-transitory computer readable medium storing instructions to enable a computer to:
    determine that a dot product coefficient is negative and changing the sign of the coefficient to a positive value;
    send the positive value to a linear interpolator;
    indicate whether the interpolator should revise the sign of the resulting dot product texel data; and
    use the programmable linear interpolator, that does not accept negative coefficients, to calculate the dot product and to convert the sign of texel data in the dot product.

22. The non-transitory computer readable medium of claim 21 further storing instructions to compensate for the sign change of the dot product coefficient by reversing the sign of the corresponding channel value during a filtering operation.

23. The non-transitory computer readable medium of claim 21 further storing instructions to compensate for the sign change by passing a control mask for each of the texels with a negative coefficient to a texture control.

* * * * *